United States Patent [19]

Smith et al.

[11] Patent Number: 5,538,430
[45] Date of Patent: Jul. 23, 1996

[54] SELF-READING CHILD'S BOOK

[76] Inventors: B. Gary Smith, 3230 Friar La., Garland, Tex. 75044; Alfred E. Hall, 14943 Hillcrest Rd., Dallas, Tex. 75248

[21] Appl. No.: 280,722

[22] Filed: Jul. 26, 1994

[51] Int. Cl.$^6$ ............................................. G09B 5/00
[52] U.S. Cl. ....................... 434/178; 434/179; 434/308; 434/309; 434/317; 434/335
[58] Field of Search ........................... 434/307, 308, 434/309, 317, 322, 335, 178, 179; 446/175, 397, 408

[56] References Cited

U.S. PATENT DOCUMENTS

| | | | |
|---|---|---|---|
| 4,703,573 | 11/1987 | Montgomery et al. | 434/317 X |
| 5,356,296 | 10/1994 | Pierce et al. | 434/317 |
| 5,374,195 | 12/1994 | McClanahan | 434/317 |
| 5,413,486 | 5/1995 | Burrows et al. | 434/317 |
| 5,417,575 | 5/1995 | McTaggart | 434/317 |

Primary Examiner—Richard J. Apley
Assistant Examiner—Glenn E. Richman
Attorney, Agent, or Firm—Jones, Day, Reavis & Pogue

[57] ABSTRACT

A self-reading electronic child's book that displays a sequence of indicia, such as words, and having under each indicia a visual indicator such as a light-emitting diode with the visual indicators being automatically illuminated in sequence as the child touches a switch associated with each light-emitting diode to sequentially drive a voice synthesizer that audibilizes the indicia or word associated with the light and switch that was activated.

17 Claims, 4 Drawing Sheets

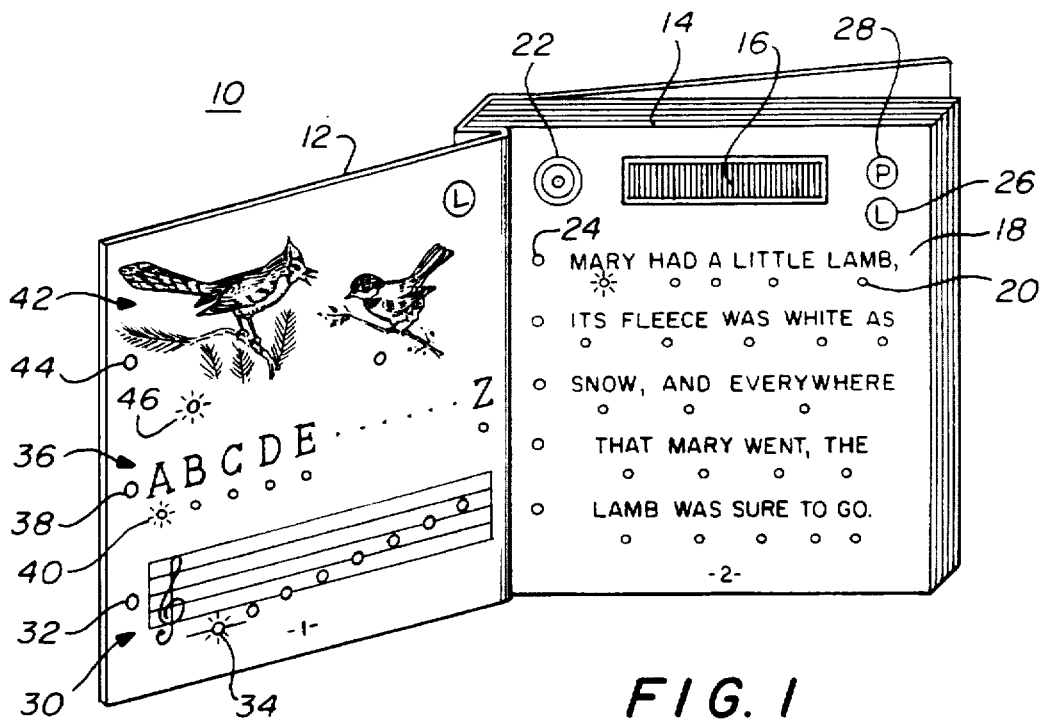
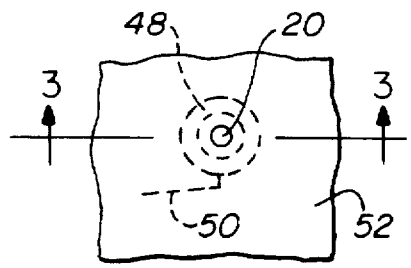
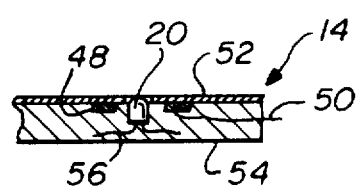
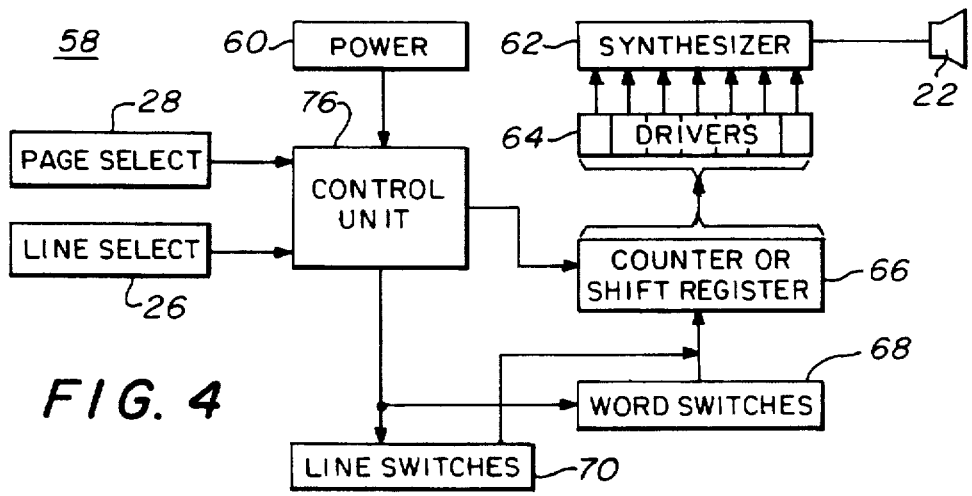

5,538,430

1
SELF-READING CHILD'S BOOK

BACKGROUND OF THE INVENTION

1. Field of the Invention

The present invention relates in general to electronic books and in particular to an electronic child's book that is self-reading when a child touches one of a plurality of illuminated lights in sequence, each light representing groups of particular indicia such as words, alphabet, musical notes, or a series of grouped elements such animals, birds, fish and the like.

2. Description of Related Art

There are many different types of electronic books and cards existing in the marketplace today. Some of these books are activated when the book is opened to automatically cause predetermined events to occur.

There is a need in the market today for a book that can be self-reading for a child and operated by the child in a simple and reliable manner. This would enable a child, when the parent is occupied or at work, to select a book and, in a simple manner, cause the book itself to read the stories therein to the child.

SUMMARY OF THE INVENTION

In the present invention, a child's book has at least one page having a plurality of sequentially associated indicia thereon. The indicia may be words such as "Mary had a little lamb" or may be letters of the alphabet, notes of the musical scale, or other sequentially associated indicia such as groups of animals, birds, fish and the like. A light-emitting diode or other economical light source is associated with each indicia. Thus, in the sentence "Mary had a little lamb", there would be a small light-emitting diode under "Mary", one under "had", one under "a", one under "little", and one under "lamb". A speech synthesizer is mounted on the page for an audible representation of each of the plurality of indicia on the page. Thus the speech synthesizer stores the words "Mary had a little lamb" such that each word can be accessed and audibly expressed individually. By closing a switch, either manually or by opening the pages of a book, a circuit initially illuminates the first one of the lights in the sequence. An actuatable touch means, such as a capacitive operated switch, is associated with each of the lights. For instance, the light may be surrounded by annular metallic ring that serves as one plate of a capacitor and is coupled to an electronic circuit in the book. The capacitor plate is under the thin sheet of paper on which the indicia is printed. When a child places a finger on the light, the body acts as the other plate of the capacitor thus causing a signal to be generated which is coupled to a shift register to cause an output to a first driver circuit which powers the speech synthesizer to cause the first indicia, such as the word "Mary", to be audibly sounded by the speech synthesizer. The circuit then automatically TURNS OFF the light under the first indicia in the sequence and TURNS ON the succeeding light for the next succeeding indicia in the sequence and the child touches that light and the sequence repeats itself. Thus the child needs only follow the bouncing ball, represented by the lights, to cause the audible expression of each of the indicia in the book. Thus if the book has several lines of words, the child may read the words in sequence simply by touching the lights in sequence. Likewise, if the notes of the musical scale are to be sounded, the light under the first note is automatically TURNED ON when the switch is thrown or the book opened and again the child touches the light, the tone of note sounds and the name of the note may be sounded and the light around the succeeding note is illuminated. The child touches that light and continues in sequence until all the notes have been sounded. Of course, the same thing can apply to the alphabet where the alphabet is sounded in sequence with each letter being audibilized as the light underneath that letter is touched by the child. The same thing can, of course, apply to groups of animals such as different types of dogs, horses, birds, fish, trees, flowers and the like.

Further, the child may read a line-at-a-time by placing the finger on a switch area on the page to select this option. When that option is selected, the first light at the beginning of the first sentence is illuminated. The child simply touches that light and that line is read. Then the next light for the next line is sequentially illuminated and the child touches that light and that line is read. The child simply goes down the page following the sequence of line-indicating lights and each line is read in sequence as the child touches the lights. The circuit is organized such that the lights can be illuminated only in sequence. Further, if there are multiple pages in the book, a page switch, which can be a capacitive switch as discussed previously, is operated and an entire page will be read. When the page is turned, the page switch on the succeeding page is touched and that page is read and so on.

Thus, it is an object of the present invention to provide a child's book that is self-reading.

It is another object of the present invention to provide a child's book that has at least one book page having a plurality of sequentially associated indicia thereon with a light or other visual indicator associated with each of the indicia such that the visual indicators are sequentially energized to enable the child to touch the area adjacent the visual indicator and cause the corresponding sound from the speech synthesizer that is an audible representation of that indicia.

It is still another object of the present invention to provide a child's reading book in which the book will make an audible representation of each indicia in sequence as the child touches a visual indicator associated with the indicia.

It is yet another object of the present invention to provide a child's book in which each line of indicia can be read automatically and sequentially by the child selecting a visual indicia associated with each line in sequence.

It is also an object of the present invention to provide a self-reading child's book wherein the child can select an entire page to be read automatically.

Thus, the present invention relates to a child's book comprising at least one page having sequentially ordered indicia on the page, a visual indicator device, preferably a light such as a light-emitting diode, in proximity with each indicia, circuit means in said book for initially activating only the first one of said visual indicator devices in said sequence, a speech synthesizer having a sound stored representing each indicia, and touch means such as a capacitor switch, associated with the initially activated visual indicator devices and coupled to the speech synthesizer for generating the stored sound for that indicia, deactivating the first one of the visual indicator devices, and activating the next succeeding one of the visual indicator devices in the ordered sequence thus enabling the book to read to the child.

BRIEF DESCRIPTION OF THE DRAWINGS

These and other more detailed features of the present invention will be more fully disclosed when taken in conjunction with the following DETAILED DESCRIPTION OF THE DRAWINGS in which like numerals represent like elements and in which:

FIG. 1 is a diagrammatic representation of an embodiment of the child's electronic book of the present invention;

FIG. 2 is an enlarged representation of one of the visual indicator devices, such as a light, under each of the sequentially ordered indicia in the book, such as words, and the touch means in the area of each visual indicator device, such as a capacitive switch, to illustrate the construction thereof;

FIG. 3 is a cross-sectional view of the light and switch of FIG. 2 taken along lines 3—3;

FIG. 4 is a simple block diagram of the electronic circuit for use in the child's electronic book of the present invention;

DESCRIPTION OF THE PREFERRED EMBODIMENT

Figure 5A:
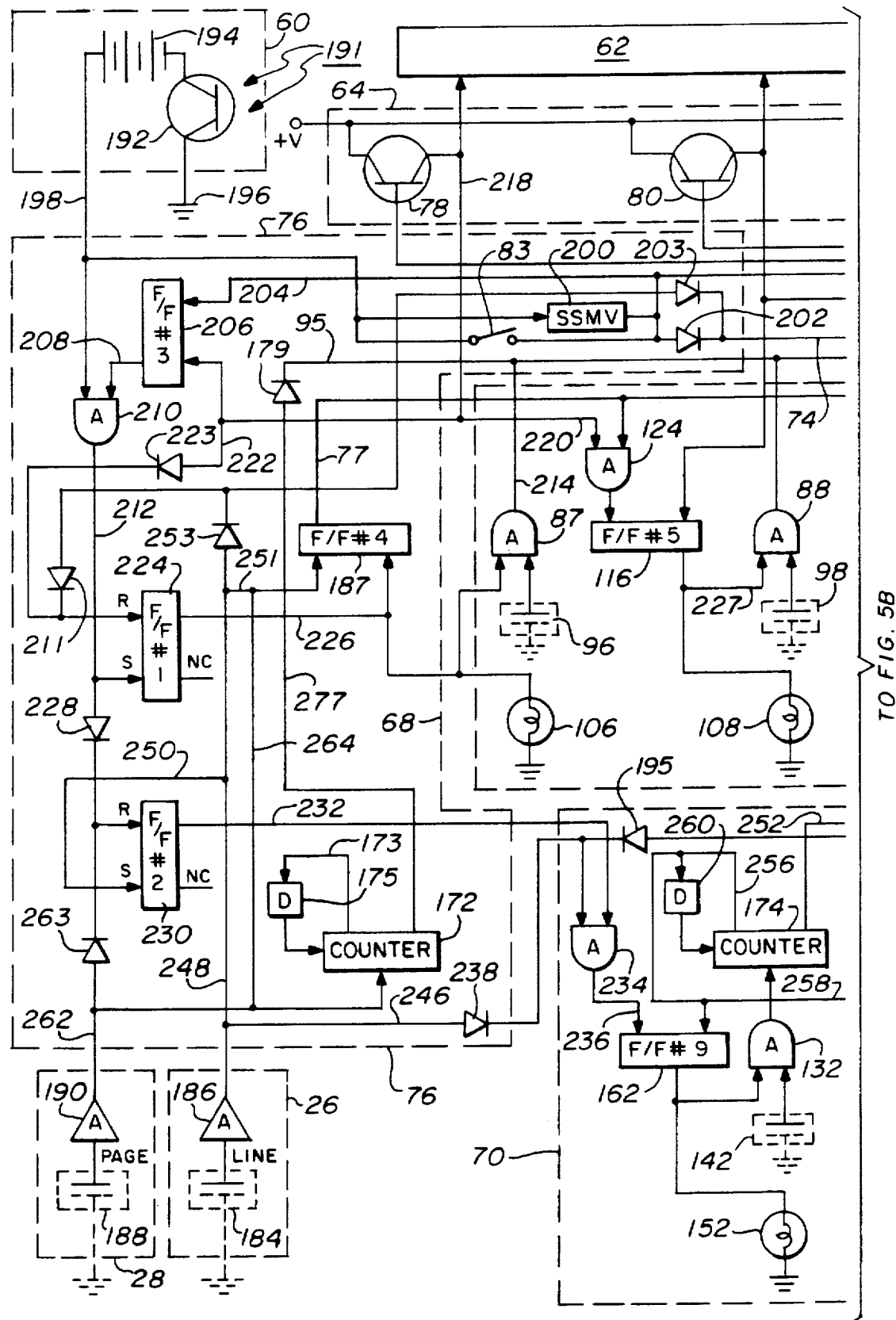
FIGS. 5A and 5B disclose a detailed circuit description of the electronic circuit used in the child's electronic book.

FIG. 1 is a diagrammatic representation of the novel child's electronic book 10 of the present invention. It is shown with first and second pages 12 and 14 but, of course, could be a single page or multiple pages. Page 14 has thereon a power source 16 that may be either solar cells or a battery having one electrode coupled to ground through a switch. For example only, the switch may be a photodiode such that when the book is opened and the photodiode is exposed to light, the negative electrode of the battery will be coupled to ground and thus energizing the circuit. On the other hand, it may be a battery with a mechanical switch that a child could operate. In still another version, the power supply 16 may be solar cells that are energized when the book is opened and the circuit is energized. The book has thereon lines of words 18 that are sequentially ordered. Thus, for the example shown, line 18 reads "Mary had a little" and associated with each word is a visual indicating device such as a light-emitting diode 20. Thus it is to be understood in this specification, when the term "light" or "light-emitting diode" is used, it is intended to mean a visual indicating means of any type. Further, a speaker 22 is formed on page 14 such that sounds representing each word or indicia are stored with a voice synthesizer 62 (FIG. 4) and may be appropriately selected. In addition, a visual indicating device, preferably a light-emitting diode, 24 is associated at the beginning of each line such that the lines can be selected to be read one-at-a-time. When the lines are to be selected instead of one word or other indicia individually, the line switch 26 must be actuated as will be shown hereafter. In addition, if it is desired to have the entire page read, the child may place a finger on the switch 28 and the electronic circuit will read the entire page. Thus the page may be read by the child one-word-at-a-time in sequence, one-line-at-a-time in sequence, or the entire page, one-page-at-a-time in sequence. As is shown on the left page 12, other indicia can be used such as the musical scale 30 that has associated with it a corresponding line visual indicating device 32 and each note has associated with it a visual indicating device 34.

In like manner, the alphabet 36 may be represented from A to Z and have associated with it a corresponding line select switch 38 along with a visual indicating device 40 and a switch associated with the visual indicating device under each letter of the alphabet. Thus each letter of the alphabet can be selected in sequence by the child.

In like manner, groups of sequentially ordered indicia such as different types of automobiles, dogs, cats, horses, birds, fish and the like are represented at 42. Associated with the line of these figures is a corresponding line select switch and visual indicia 44 and under each of the indicia 42 is a combination switch and visual indicating device 46 so that the group indicia can be selected in sequence one-at-a-time and the name sounded for each of the members of that group.

In summary, if the book in FIG. 1 had pages 12 and 14 initially closed, when they were opened, power supply 16 would energize automatically the light-emitting device under the word "Mary" in the first line 18. By the child placing the finger on the light, a switch, preferably capacitive operated switch, and described in relation to FIGS. 2 and 3, operates a circuit to cause the word "Mary" to be audibilized through the speaker 22. Simultaneously, the light under the word "Mary" is extinguished and the light under the word "had" is illuminated. Thus the child moves to the light under the word "had" and presses a finger over the light 20 thereunder. The speaker 22 enunciates the word "had", the light under the word "had" is extinguished, and the light under the article "a" is illuminated. Thus this sequence is followed by the child word-by-word simply by "following the bouncing ball" or following the lights 20 which are illuminated, and extinguished, in sequence. Once the child has learned how to read the words somewhat, if desired, the child may press the switch 26 which will disable the word select circuit and illuminate light 24 at the beginning of the first line 18. By pressing a finger over the light 24, the speaker 22 will sound the words in the line 18 in sequence. At the end of the line 18, the light 24 will be extinguished and the light illuminated at the beginning of the second line. This procedure is followed in sequence such that the child, simply by touching the light at the beginning of each line in sequence, can read the page a line-at-a-time.

The same thing applies to the indicia indicated on page 12. Any well-known circuit can be used to select which page is to be read. When the book is opened, again the light 46 under the first indicia in line 42 is illuminated and the child, by pressing that light and the other lights in that line in sequence, may hear the names of the particular group enunciated in sequence by the speaker 22 as the child touches each light 46 in sequence. The same thing happens with respect to the alphabet in line 36 with the child pressing the light 40 for the letter "A" and the subsequent lights under the subsequent letters B, C, D through Z. Again, in like manner, to learn the notes of a musical scale, the light 34 would be illuminated and the child may successively touch the lights that are illuminated in sequence on the scale 30 and thus learn the sound, the name of the note and, of course, can visually see where each note is located on the scale. Again, a light 32, 38 and 44 is placed at the beginning of each line and, by selecting a line, the child can read each line entirely by pressing that light as explained earlier.

FIG. 2 illustrates an enlarged plan view of a light-emitting diode 20 surrounded by a capacitive switch 48 that is located under the printed portion of the page and having an electrical lead 50 that can be coupled into the circuit. Such switches are old and well known in the art. In addition, any other type of switch may be used as desired as long as it supplies an input to the AND gates.

FIG. 3 is a cross-sectional view of the capacitive switch 48 and light-emitting diode 50 taken along lines 3—3 of FIG. 2. It will be noted that the page 14 has an upper thin portion 52 on which the indicia is printed and a thicker portion 54 which will include the electronic circuit. The light-emitting diode 20 protrudes through an opening in the upper portion 52 so that it is visible to the child. The lower portion of the light-emitting diode 20 is embedded in the second layer 54 and has electrical leads 56 that can be connected to the electronic circuit. The capacitive plate 48 is just under the thin upper surface 52 so that when the child's finger is placed over the light 20, it will form a second capacitive grounded plate with respect to plate 48 thus creating a signal that can be used in the circuits hereafter as will be described in relation to FIG. 5.

Figure 5B:
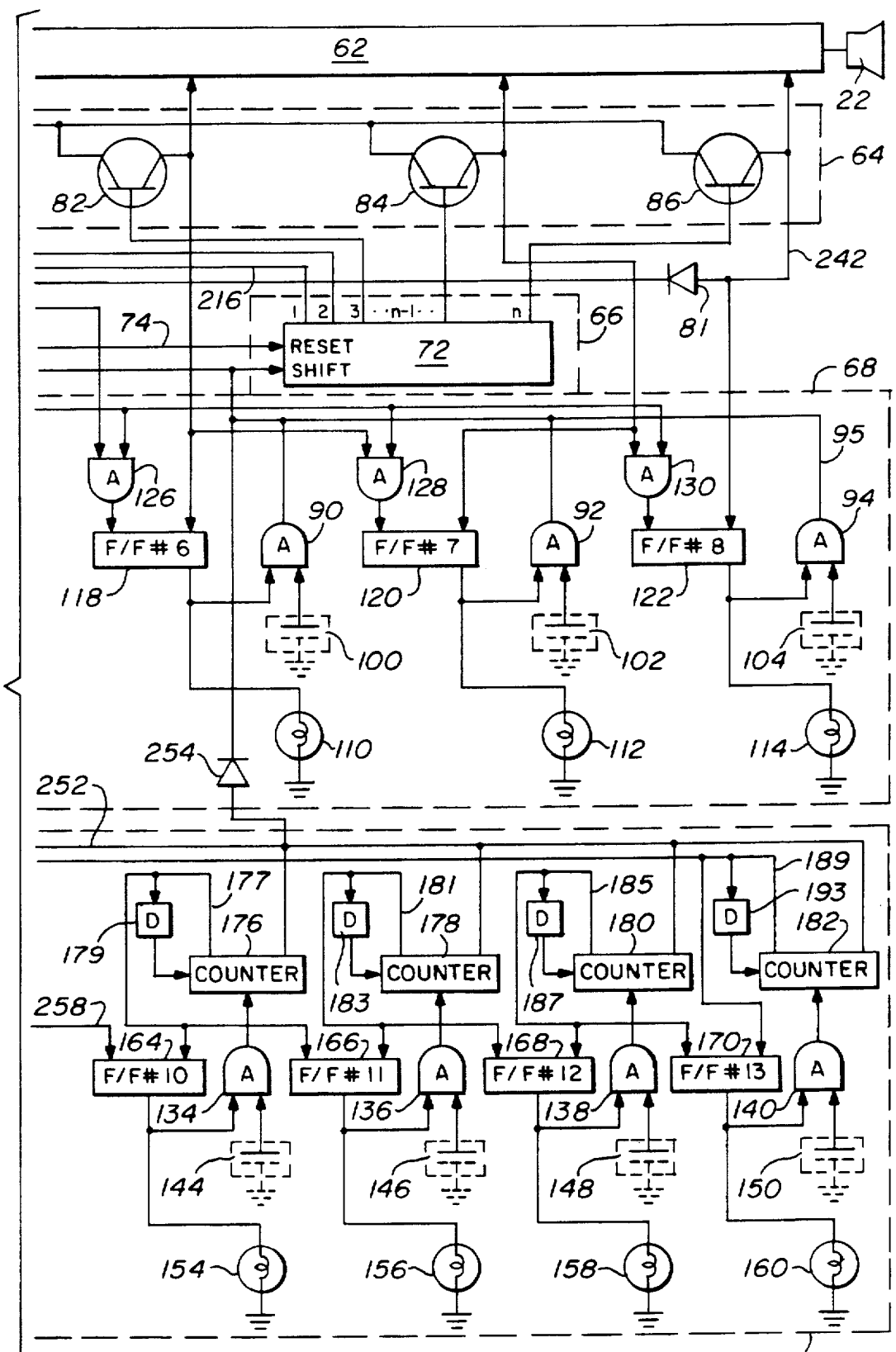

FIG. 4 illustrates in block diagram form the electronic circuit 58 for use in the child's electronic book. It comprises a power supply 60 for supplying necessary energy to all of the circuit components and a speech synthesizer 62 that stores on chips the sounds representing each indicia in each line of indicia on the pages of the book. The synthesizer 62 is coupled to a speaker 22. Such speech synthesizers are old and well known in the art and will not be discussed in any more detail here. The synthesizer 62 is driven by a driver network 64 also well known in the art. A counter or shift register 66 automatically, when RESET, causes the drivers 64 to sequentially drive the synthesizer 62 to cause it to sound a particular word that is selected as will be shown hereafter. The words are selected by means of individual word switches 68. If it is desired to have the book read a line-at-a-time, line switches 70 are provided and are activated by a line select switch 26 through control unit 76. If the entire page is to be read at one time, the page select switch 28 is activated. Control unit 76 receives the signals from the line select switch 72 and the page select switch 74 and does the necessary inhibiting of word switches and line switches, RESETS the shift register 66 as necessary, and provides the input pulses to the counter or shift register 66 to cause the synthesizer to read out loud words, lines, or pages in sequence as selected. FIG. 5 is a detailed circuit diagram of the electronics for the novel child's book disclosed herein.

The speech synthesizer 62 is shown coupled to the speaker 22. The speech synthesizer driving circuit 64 comprises a plurality of transistor switches 78, 80, 82, 84 and 86, as needed, which, when energized, couple the B+ voltage from power source 194 to the selected speech synthesizer to cause a particular word to be sounded. The counter or shift register 66 has a chip 72 that produces outputs on lines 1-n as needed. It has a reset input 74 and a clock signal input 81. A manual reset switch 83 can be provided as desired.

The word select unit 68 includes a plurality of AND gates 87, 88, 90, 92 and 94 whose outputs are coupled to a common bus 95 that is coupled to the clock input terminal 81 of shift register 72. The word select unit 68 also includes the capacitive switches 96, 98, 100, 102 and 104 that are associated with the individual words "1-n". In addition, as explained previously, associated with each capacitive switch 96-104 is a corresponding visual indicating device such as light-emitting diodes 106, 108, 110, 112 and 114. Flip-flops 116, 118, 120 and 122 are driven by AND gates 124, 126, 128 and 130, respectively, to illuminate and extinguish the light-emitting diodes 108-114.

In like manner, when line select switching unit 70 is utilized, AND gates 132, 134, 136, 138 and 140 are activated by capacitive switches 142, 144, 146, 148 and 150, respectively. Also associated with each line is a visual indication device such light-emitting diodes 152, 154, 156, 158 and 160, respectively. Counter 172 in control unit 76 and counters 174, 176, 178, 180 and 182 in line switch select assembly 70 count the words in each line that are to be sounded.

Line select switch 26 includes capacitive switch 184 and amplifier 186 and disables the word select circuit 68 through control unit 76 and enables line select circuit 70 so that the particular lines can be selected in sequence.

Page selection switch 28 includes a capacitive switch 188 and amplifier 190 that not only inhibits the word select circuit 68 and line select circuit 70 but also enables a counter 172 in the control unit 76 that produces an output on line 95 to the input of shift register 78 to read all of the indicia on a given page.

The control unit 76 contains the circuitry for initializing operation of the book and for inhibiting the proper word select circuit 68 or line select circuit 70.

The operation of the device will now be described. When the book pages are opened, three major events occur. First, the counter or shift register 72 is initialized or set to zero. Second, the word select circuit 68 is enabled and the first word light 106 is illuminated. Third, the line select circuit 70 is disabled. When the book is opened, light that strikes photodiode 192 will energize the photodiode and connect the negative terminal of battery 194 to the ground 196, thus providing power to the circuits. The battery circuit 60, of course, as stated earlier, may be solar cells that, when the book is opened, simply produce power. In other embodiments, the photodiode 192 could be a mechanical switch as desired. At any rate, when the power supply 60 is energized, an output is produced on line 198 that is coupled to a single-shot multivibrator 200 whose output is coupled to shift register or counter circuit 66. The multivibrator 200 produces a single pulse that is coupled through diode 202 on line 74 to the reset input of shift register 72 thus setting it to zero. At the same time, the output of single-shot multivibrator 200 is coupled on line 204 to the set input of flip-flop 206 thus causing an output on line 208 to AND gate 210 as an input. The other input is from the power supply on line 198 and thus AND gate 210 is enabled and generates an output on line 212. This output is coupled to the SET side of flip-flop 224 to cause an output on line 226 to the first indicating light 106 and to one input of AND gate 87 related to the first word in the word select circuit 68. Thus the light 106 is energized simply by opening the book or by closing a switch to couple the power supply to the circuit. At the same time, the output of AND gate 210 on line 212 is coupled through diode 228 to RESET flip-flop 230 and removes any output on line 232 thus disabling line select circuit 70. Also, the output of flip-flop 224 on line 226 SETS flip-flip 187 to generate an output on line 77 that enables AND gates 124-130 so that all individual word select circuits are enabled. When the child touches capacitive switch 96 in word select circuit 68, the second input is coupled to AND gate 87 that generates an output on line 214 which is coupled to the common bus 95 and thence to the input to shift register 72 that causes a signal on the first output line 216 to the base of the transistor switch 78 thus causing it to conduct and apply power to the speech synthesizer 62 to cause the first word to be enunciated by speaker 22. At the same time transistor switch 78 energizes the speech synthesizer, it also couples an output on line 218 which is coupled to the reset input of flip-flop 206 removing the enable signal on line 208 to AND gate 210. Thus, AND gate 210 ceases to generate an output on line 212 to the SET side of flip-flop 224. Simultaneously, the signal on line 218 from transistor driving switch 78 is coupled on line 222 through diode 223 to RESET flip-flip 224 and the first light 106 is extinguished. Also, the signal on line 218 is coupled on line 220 to AND gate 124 that already has the other enabling input applied thereto on line 77. AND gate 124 thus RESETS the flip-flop 116 and illuminates the next sequential light 108 and enables AND gate 88.

Thus, when flip-flop 206 was RESET, the same signal on line 218 was also coupled on line 222 as a RESET input to flip-flop 224 removing the output on line 226 thereof. The removal of this signal on line 226 causes light 106 to be extinguished and causes a first input to be provided to AND gate 88 on line 227 as described earlier.

At the same time flip-flop 224 was RESET, the signal was also conducted through diode 228 to the RESET side of flip-flop 230 thus removing any signal on the output line 232 thereby preventing AND gate 234 from generating an output on line 236 to the SET input of flip-flop 162, thus disabling the line select circuit 70.

Each of the capacitive switches 96, 98, 100, 102 and 104 in word select circuit 68, when actuated in sequence as each of the lights 106, 108, 110, 112 and 114 is illuminated in sequence, causes the shift register 78 to shift one position each time with the actuation of one of the capacitive switches so that the proper driving transistor in circuit 64 is actuated to cause the proper word to be selected in the speech synthesizer for audibilization at speaker 22. When the capacitive switch 104 is activated, the last switch for word "n" in word selecting circuit 68, AND gate 94 produces an output on line 95 to step the shift register to the nth line output 240 which actuates the driving transistor 86 and causes the voice synthesizer 62 to produce the last word. At the same time, the output of the driving transistor 86 on line 242 resets flip-flop 122 and extinguishes light 114. At the same time it passes through diode 81 as an input to the RESET circuit 80 of shift register 72 through diode 202 and is also coupled to the SET input of flip-flop 206 to produce an output line 208 and again enable AND gate 210 to generate an output on line 212 that RESETS flip-flop 224 and generates an output on line 226 that illuminates the first light 106 and again enables AND gate 87. Thus the unit is ready to repeat the sequence.

If it is desired to read the book one-line-at-a-time, line select circuit 26 is actuated by pressing capacitive switch 184. The signal then passes through an amplifier 186 on line 246 and through isolation diode 238 as one input to AND gate 234 in the line select switching circuit 70. The signal on line 246 is also coupled on lines 248 and 250 to the SET input of flip-flop 230 that causes an output on line 232 that provides the other enable to AND gate 234. Thus an output is thereby produced on line 236 to flip-flop 162 energizing light 152 for line one in line select circuit 70 and enabling AND gate 132. In addition, the signal on line 248 is coupled through diode 253 and diode 211 to the RESET input of flip-flop 224 thus removing the output on line 226. Further, the signal on lines 248 and 251 provides a RESET signal to flip-flop 187 thereby removing the signal on line 77 and disabling the word select circuit 68. Since the word select circuit 68 has been inhibited, the lines can now be selected for reading as explained previously.

Since the first light source 152 is illuminated when the child places the finger over the light and actuates capacitor switch 142, AND gate 132 is enabled which generates an input to counter 174. Counter 174 is programmed to produce as many outputs as there are words in the first line with the outputs spaced in time sufficient to allow each word to be audibilized by the speech synthesizer 62. The output of the counter 174 on common bus 252 is coupled through diode 254 to the common bus 95 where it is applied to the shift input of the shift register 78 and causes the shift register 78 to move sequentially from one output to the next until the words in the first line have been audibilized. At that point, the counter 174 generates an output on line 256 that not only RESETS flip-flop 162 thus extinguishing the first light 152 but also, through line 258, SETS flip-flop 164 thus illuminating the second light 154. Simultaneously, the output of counter 174 on line 256 passes through a delay line 260 to RESET counter 174 so that it is ready for use in the next cycle. Each of the remaining line select circuits function in the same manner with capacitive switch 144 being operated in sequence with switches 146, 148 and 150 as lights 156, 158 and 160 are illuminated. When the last line is read, counter 182 RESETS flip-flop 170 thereby extinguishing light 160 and providing an input to AND gate 234 through diode 195 to RESET flip-flip 162 and illuminating first light 152. Thus, the circuit is ready for use.

When the page select circuit 28 is activated by the child placing a finger over capacitive switch 188, the signal is amplified by amplifier 190 which generates a signal on line 262 and through diode 263 to RESET flip-flop 230 thus ensuring that there is no output on line 232 to the line select circuit 70. The signal also passes through line 264, diode 253, and diode 211 to the RESET side of flip-flop 224 ensuring that there is no signal on line 26 thus removing the enable to AND gate 86 in the word select circuit 68. In addition, the signal on line 264 RESETS flip-flip 187 that removes the ENABLE to all of the RESET AND gates 124, 126, 128 and 130 in the word select circuit 68. Thus the word select circuit is inhibited. The signal output from the page select circuit 28 also starts counter 172 counting all of the words on the page in sequence with time between each word so that it can be audibilized by the voice synthesizer 62. Each pulse from the counter passes through isolating diode 179 to common bus 95 to shift the shift register 72. Initially, the signal on line 264 passed through diode 253 and diode 203 to the RESET input 74 of the shift register 72, thus having initially reset it to zero. Now it can count through all of the words on the page. When it reaches the last word or the nth word, an output is generated by the counter 172 on line 173 that passes through a delay 175 and RESETS the counter 172 to zero, thus enabling the sequence to be repeated as desired.

Figure 6:
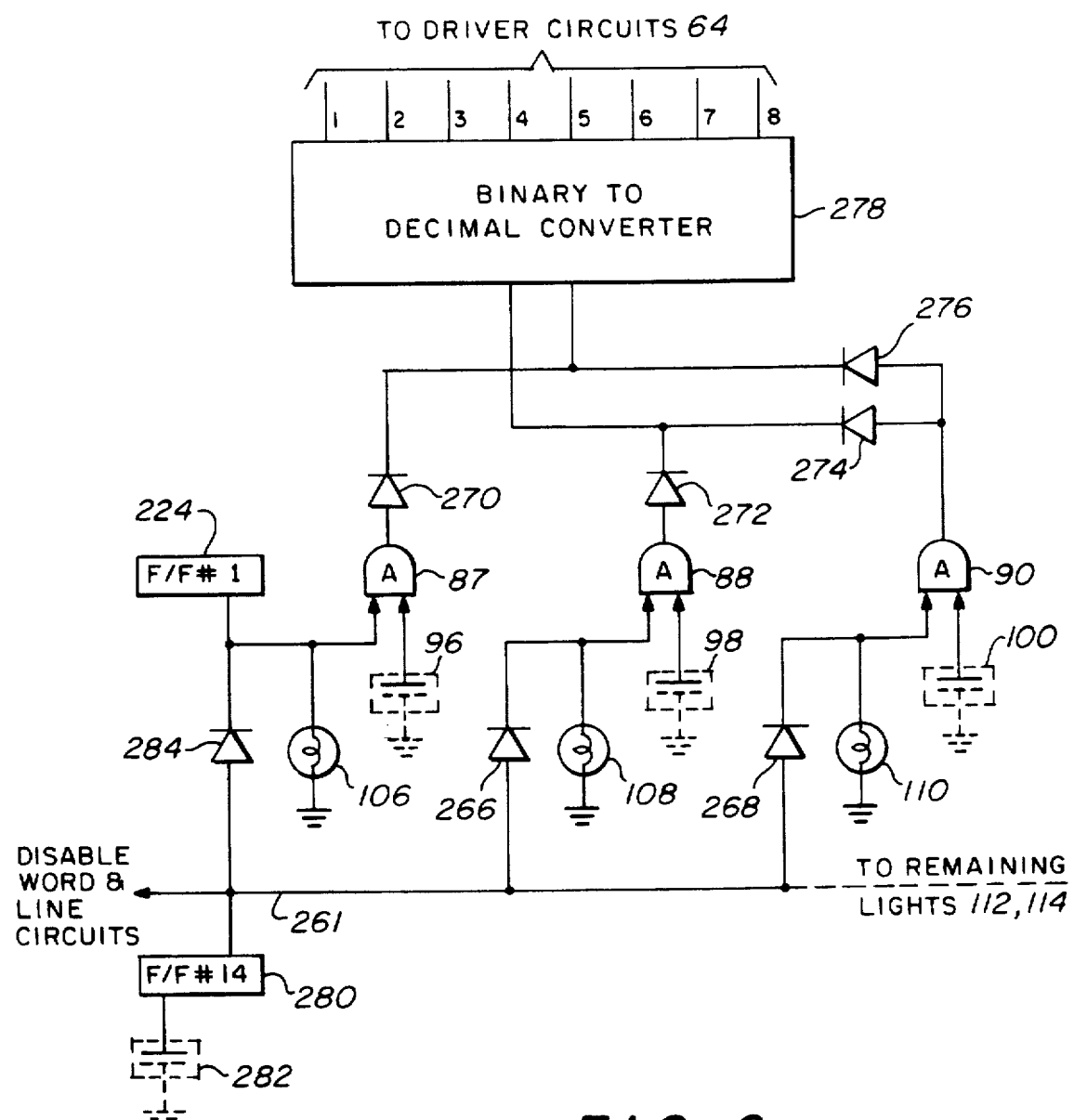
FIG. 6 is an alternate circuit that enables any individual word to be selected by a child for audibilization.

FIG. 6 illustrates an alternate circuit for allowing the child to select any indicia or word on a page individually. In FIG. 6, overriding flip-flop 280 can be energized by capacitive switch 282 in a manner already described. The output from flip-flip 280 on line 261 may be coupled to all light-emitting diodes 106–110 and all AND gates 87–90 through isolation diodes 266, 268, and 284. Thus, any capacitor switch (96, for example,) may be activated. The output from the AND gates 87–90 is coupled through isolation diodes 271–276 to the input of a binary-to-decimal converter 278 well known in the art. AND gate 87 will cause an 001 to be generated in this example thus causing the first word to be sounded. If AND gate 90 is enabled, an 011 is applied to the converter 278 and the third word is audibilized. Thus as many words or indicia may be selected as desired depending upon the size of the binary-to-decimal converter 278.

The output of flip-flop 280 can also be used to disable and override the other circuits as previously explained.

In summary, when a page is energized or a book is opened, a power supply 60 generates an output pulse which initiates the shift register 72 by resetting it to zero, enabling the word select circuit 68 and disabling the line select circuit 70. Then the light-emitting diode under the first word is illuminated so that the child can then activate the capacitive switch in the area of the first light, listen to the first word, see the light move to the second word, touch the second light, hear the word and see the light move to the third word and so forth. Thus all the child has to do is to "follow the lights in sequence" to read the book. The lights are preferably red LED's, well known in the art.

If it is desired to read the book one-line-at-a-time, the child simply activates the line select switch 26 that, in turn, RESETS the shift register 72 to zero, inhibits the word select circuit 68, and enables the line select circuit 70. At that time, the light in front of the first line on a page is illuminated. The child simply touches that light to activate the first capacitive switch which causes a counter to increment shift register 72 until all of the words in the first line are read. The counter then produces an output which TURNS OFF the first light, resets the counter to zero, and TURNS ON the second light in front of the second line. The sequence then repeats itself until all the lines have been read. When the last line has been read, the output resets the stage for the first line causing the first line light to be illuminated so that the sequence can be repeated.

When the page switch is selected, the shift register 78 is reset, the word select circuit 68 is inhibited, and the line select circuit 70 is inhibited. A counter then generates incremental signals to the shift register 78 which increments one-word-at-a-time allowing an entire page to be read.

When the individual word select switch 282 sets flip-flop 280, any individual word or indicia may be selected.

As stated previously, instead of words, the lights could enable each letter of the alphabet in sequence, thus teaching a child the alphabet. In like manner, the lights could illuminate respective notes of a scale to allow the child not only to hear the tone but to hear the word describing the note.

Again, the invention is intended to teach a child about any group of elements, words, places, or things so long as they are done in sequence with the primary purpose of teaching the child to learn to read or allowing the child to select any one indicia out of sequence.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

We claim:

1. A child's book having a power source associated therewith, an electronic circuit, and a selectively activated switch device for coupling the power source to said electronic circuit, said book and electronic circuit including at least one book page having a plurality of sequentially associated indicia thereon;

at least one light associated with each indicia;

a speech synthesizer mounted on said page for storing an audible representation of each of said plurality of indicia on said page;

said circuit initially illuminating only the first one of said lights in said sequence when said switch couples said power source to said electronic circuit;

actuatable touch means associated with each light and coupled to said electronic circuit such that when said touch means associated with said initially illuminated light is actuated, said speech synthesizer is activated to sound the audible representation associated with said indicia and initially illuminated light; and signal responsive means for automatically de-energizing said illuminated light after said touch means is activated and illuminating only the succeeding one of said lights in said sequence wherein when each succeeding actuatable touch means, associated with each succeeding illuminated light and each succeeding indica, is activated, said speech synthesizer is activated to sound the audible representation of said associated indicia, and each illuminated light being de-energized upon illumination of each succeeding light until the audible representation for all of said indicia have been sounded.

2. A book as in claim 1 wherein said touch means including:

a switch associated with each said indicia for coupling an input to the electronic circuit for enabling the stored sound for only the associated indicia to be audibilized; and said light associated with each indicia being sequentially energized to indicate the indicia to be audibilized thereby enabling a predetermined sequence of sounds to be audibilized.

3. A book as in claim 2 wherein said lights are light-emitting diodes.

4. A book as in claim 3 wherein said switches are capacitive switches operated by the touch of the human body.

5. A book as in claim 4 wherein said sequential indicia are words and said audibilized sounds identify said words.

6. A book as in claim 4 wherein said sequential indicia are pictures and said audibilized sounds identify said pictures.

7. A book as in claim 4 wherein said sequential indicia are musical notes and said audibilized sounds identify said notes by word and tone.

8. A book as in claim 4 wherein said sequential indicia are letters of the alphabet and said audibilized sounds identify each of said letters.

9. A book as in claim 4 wherein said indicia is a line of words and said audibilized sounds are each word in said line audibilized in sequence.

10. A book as in claim 4 wherein:

said indicia is a page of lines of words;

an actuatable line select touch means associated with each line; and said audibilized sounds are each word in each line audibilized sequentially line-by-line as said line touch means are sequentially actuated.

11. A book as in claim 10 further including at least two hinged pages forming said book as an openable book; and means associated with said pages for initially illuminating a predetermined one of said lights only when said book is opened.

12. A book as in claim 11 wherein said selectively activated control device is a photo voltaic cell that receives light when said book is opened to energize said speech synthesizer and said electronic circuit for powering said circuit and initially illuminating said first light in said sequence.

13. A book as in claim 11 wherein said selectively activated control device is a phototransistor which couples said power supply to said electronic circuit including said lights and said speech synthesizer only when said pages of said book are opened.

14. A book as in claim 4 further including:

a counter; and circuit means for coupling said counter to said touch means and said speech synthesizer whereby when one of said touch means is actuated, the stored sounds for said associated indicia are audibilized.

15. A book as in claim 4 further including:

indicia as words, lines of words, and a page of lines of words;

selectively activated switch means for individual words, individual lines of words, or an individual page of said lines to be audibilized; and circuit means coupling said selectively activated switch means to said speech synthesizing means such that the selected individual words are selectively audibilized, words in a selected line are sequentially audibilized, and words on an entire page of lines of words are sequentially audibilized.

16. A child's electronic book as in claim 10 further including:

page switch means coupled to said electronic circuit for disabling said switch means for illuminating said lights in sequence and said line actuatable touch means; and said page reading switch means causing said electronic circuit to audibilize each indicia on said page in sequence thus audibilizing the entire page of indicia.

17. A child's electronic book including:

at least one page having a plurality of sequentially ordered words on said page; a light associated with each word;

circuit means including control means for initially activating only the first one of said lights in said sequence;

a speech synthesizer having a sound stored representing each word;

touch means associated with said initially illuminated light and coupled to said speech synthesizer for generating said sound stored for the word, de-energizing its associated illuminated light and illuminating succeeding one of said lights in said ordered sequence wherein each succeeding touch means associated with each succeeding illuminated light enables the succeeding associated word to be sounded and each of said illuminated lights being de-energized upon illumination of a succeeding light thus enabling the electronic book to be operated by and read to the child; and a power source selectively coupled to said circuit means for energizing said circuit means.

* * * * *